United States Patent
Jensen (10) Patent No.: US 7,269,099 B2
(45) Date of Patent: Sep. 11, 2007

(54) AIR GUN

(75) Inventor: Harry Thomas Jensen, Shelton, CT (US)

(73) Assignee: Bolt Technology Corporation, Norwalk, CT (US)

( * ) Notice: Subject to any disclaimer, the term of this patent is extended or adjusted under 35 U.S.C. 154(b) by 219 days.

(21) Appl. No.: 10/903,253

(22) Filed: Jul. 30, 2004

(65) Prior Publication Data

US 2006/0021609 A1    Feb. 2, 2006

(51) Int. Cl.
*G01V 1/137*    (2006.01)
(52) U.S. Cl. .................................................. 367/144
(58) Field of Classification Search ............... 367/144; 181/113, 119
See application file for complete search history.

(56) References Cited

U.S. PATENT DOCUMENTS

| | | | |
|---|---|---|---|
| 3,958,647 A | 5/1976 | Chelminski | 173/127 |
| 3,997,021 A | 12/1976 | Chelminski | 181/106 |
| 4,038,630 A | 7/1977 | Chelminski | 367/23 |
| 4,108,271 A | 8/1978 | Chelminski | 181/119 |
| 4,210,222 A | 7/1980 | Chelminski et al. | 181/107 |
| 4,234,052 A | 11/1980 | Chelminski | 181/120 |
| 4,240,518 A | 12/1980 | Chelminski | 181/107 |
| 4,266,844 A | 5/1981 | Chelminski | 439/460 |
| 4,271,924 A | 6/1981 | Chelminski | 181/120 |
| 4,316,521 A | 2/1982 | Chelminski | 181/114 |
| 4,377,355 A | 3/1983 | Chelminski | 405/232 |
| 4,383,582 A | 5/1983 | Chelminski | 173/131 |
| 4,472,794 A | 9/1984 | Chelminski | 367/144 |
| 4,597,464 A | 7/1986 | Chelminski | 181/114 |
| 4,599,712 A | 7/1986 | Chelminski | 367/144 |
| 4,608,675 A | 8/1986 | Chelminski | 367/189 |
| 4,712,641 A | 12/1987 | Chelminski | 181/113 |
| 4,723,230 A | 2/1988 | Chelminski | 367/20 |
| 4,739,859 A | 4/1988 | Delano | 181/119 |
| 4,754,443 A | 6/1988 | Chelminski | 367/144 |
| 4,757,482 A | 7/1988 | Fiske, Jr. | 367/144 |
| 4,779,245 A | 10/1988 | Chelminski | 367/144 |
| 4,798,261 A | 1/1989 | Chelminski | 181/120 |
| 4,858,718 A | 8/1989 | Chelminski | 181/106 |
| 4,939,704 A | 7/1990 | Chelminski | 367/146 |
| 5,315,917 A | 5/1994 | Mayzes | 91/418 |
| 5,432,757 A | 7/1995 | Chelminski | 367/144 |
| 5,615,170 A | 3/1997 | Chelminski | 367/15 |
| 6,464,035 B1 | 10/2002 | Chelminski | 181/120 |
| 6,612,396 B1 | 9/2003 | Chelminski et al. | 181/113 |
| 2006/0021609 A1* | 2/2006 | Jensen | 124/56 |

* cited by examiner

*Primary Examiner*—Dan Pihulic
(74) *Attorney, Agent, or Firm*—Bourque and Associates (57)    ABSTRACT

A seismic air gun includes an operating chamber, a firing chamber, a port, and a longitudinally disposed cavity sized and shaped to accept a plurality of wires. A moveable shuttle includes a shuttle flange within the operating chamber at one end and a firing shuttle flange at the other end proximate the port and firing chamber. The return force urging the shuttle from the unloaded position to the loaded position is independent of the radial thickness of the shuttle and is directly proportionate to the difference between a first and a second radial cross-sectional thickness of the shuttle flange. As a result, the return force can be optimized without any resulting loss of structural integrity to the shuttle, thereby allowing the port to stay open longer and increasing the amplitude of the primary seismic wave. Seals allow the gun to operating without water lubrication.

20 Claims, 7 Drawing Sheets

AIR GUN

TECHNICAL FIELD

The present invention relates to high pressure air guns designed for operation in underwater seismic exploration and more particularly, to large-diameter cylinder-shuttle air guns.

BACKGROUND INFORMATION

Large-diameter cylinder-shuttle air guns for producing powerful impulses are known to those skilled in the art. One such design is disclosed in U.S. Pat. No. 5,432,757 to Chelminski which is incorporated fully herein be reference. Such large-diameter cylinder-shuttle air guns have many advantages which result from the fact that a powerful impulse of air may be released is readily repeatable as desired. Such powerful impulses are useful for seismic exploration.

For example, in seismic exploration, such air guns are used to generate seismic impulses transmitted into the medium in which the air guns are positioned, such as in (water) the sea, or in a more solid mass which contains water, (such as drilling mud in oil wells). It is also possible to submerge such seismic air guns in marshland, swamp or mud areas that are infused with sufficient water that the seismic surveying apparatus described herein can be used. Accordingly, the term "water" as used herein is intended to include marshland, swamp, mud or other medium that contains sufficient water to enable such apparatus to be used.

In seismic surveying, seismic wave energy is generated by air guns submerged in the water and is utilized to investigate subsurface geological conditions and formations. For this purpose, one or more of such air guns (typically one or more arrays of, for example, four to forty air guns) are submerged in the water, and compressed air or other gas(es) under pressure is fed to the submerged guns and temporarily stored therein. At the desired instant, the air guns are actuated, i.e., fired, by means of a trigger mechanism (such as an electrically operated trigger valve i.e. a solenoid valve), and the pressurized gas is abruptly released into the surrounding water. In this manner, powerful seismic waves are generated capable of penetrating deeply into subsurface material to be reflected and refracted therein by the various strata and formations. The reflected or refracted waves are recorded and analyzed to provide information and data about the geological conditions and formations reflecting the seismic waves.

While the known air guns are fairly effective at producing the necessary seismic waves, they suffer from several disadvantages. When a seismic gun fires, the seismic pulses generated 200, FIG. 1, include a first, primary and generally large pulse 186 followed by several smaller secondary pulses 188 (only one of which is shown) which get progressively smaller as a function of time. This pattern is caused, in part, by the movement of the firing flange which opens communication between the annular firing chamber and one or more ports in the air gun through which a sudden blast of compressed air is discharged from the firing chamber out through the ports, thus creating a large-circumference torus bubble which produces a high peak pressure in a surrounding body of water. See U.S. Pat. No. 5,432,757 to Chelminski, for additional information.

Figure 1:
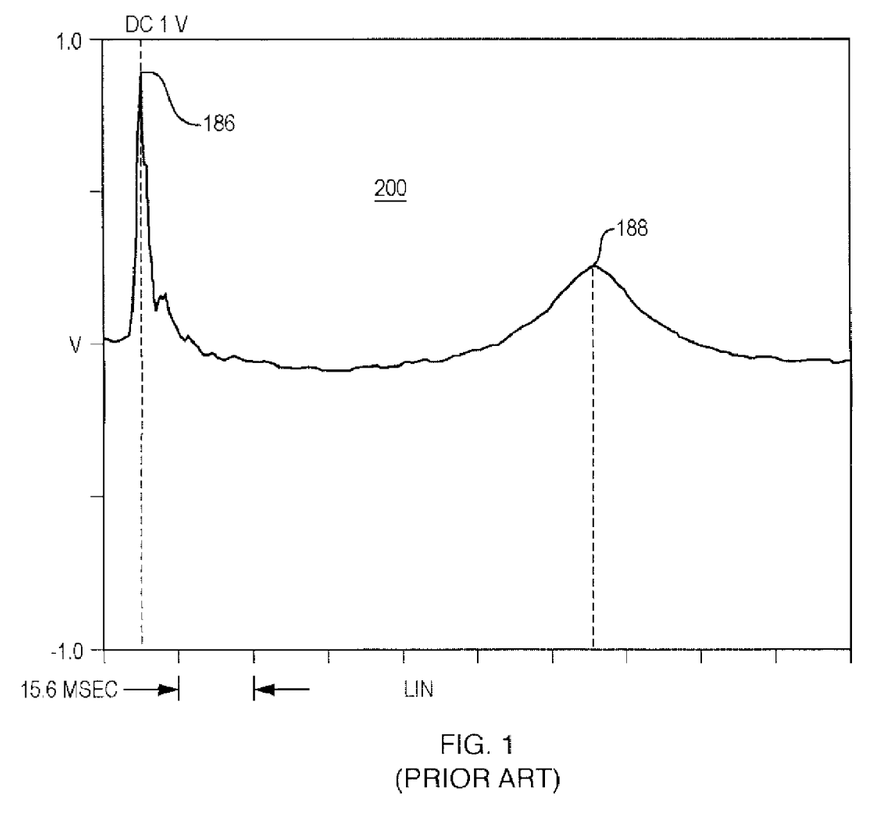
FIG. 1 is graphical illustration of a seismic wave as a function of time produced by a typical seismic gun.

Ideally, the pulse generated by the air gun would include only a single pulse 186 having an infinite slope and a large amplitude. The presences of the secondary pulses 188 tend to mask the received or reflected signal created by the primary pulse 186 and therefore must be compensated for and reduced or eliminated as much as possible.

Figure 2:
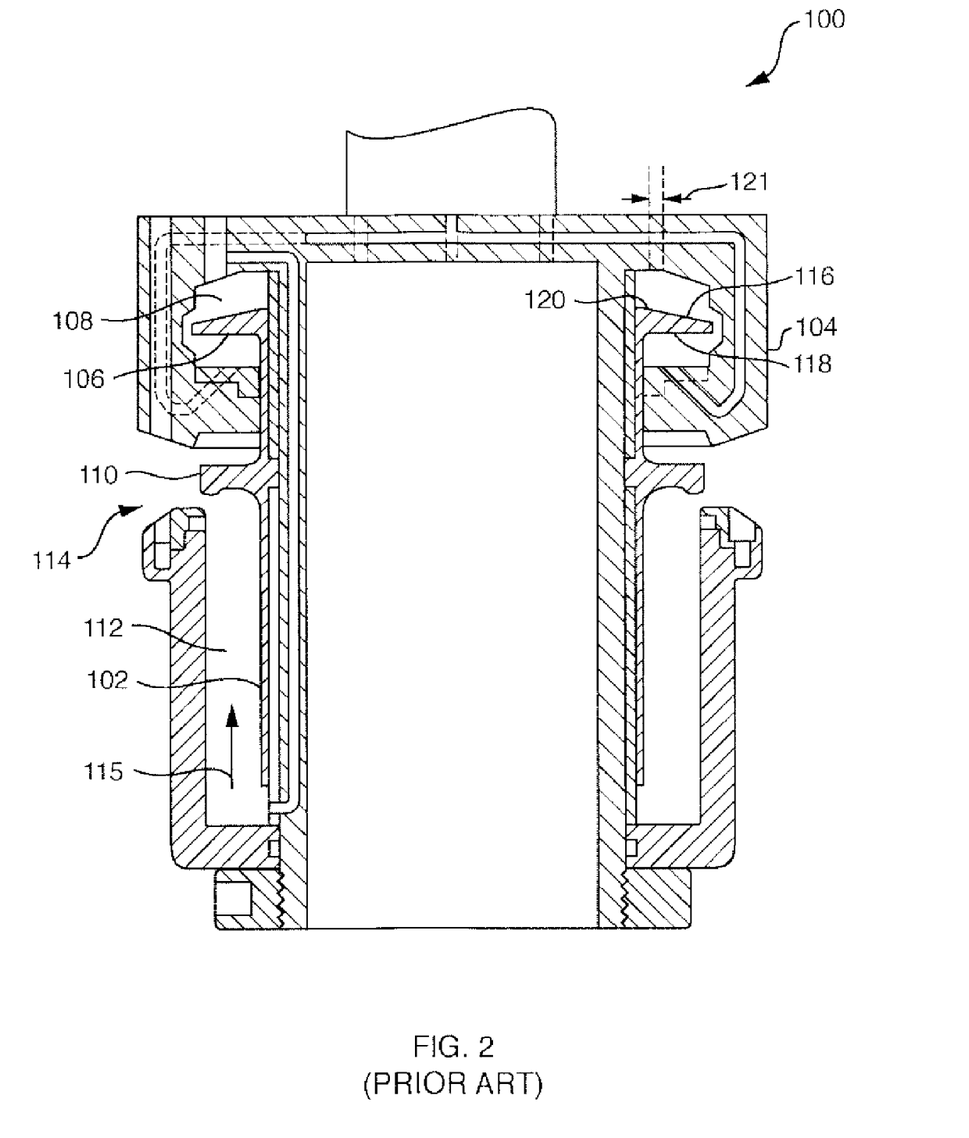
FIG. 2 is a cross section view of a prior art seismic gun.

The known large-diameter cylinder-shuttle seismic air guns 100, FIG. 2, include an annular shaped moveable shuttle 102 slidely disposed within a cylindrically shaped body 104. The shuttle 102 includes a operating chamber flange 106 disposed at one end of the shuttle 102 within an operating chamber 108 and a firing chamber flange 110 disposed proximate a firing chamber 112. In the loaded position, the firing chamber flange 110 blocks the firing chamber 112 from the annular port 114 and high pressure air builds-up within the firing chamber 112.

A force then acts on the shuttle 102 to move the shuttle 102 in the direction of arrow 115 from the loaded position to the unloaded position where the annular port 114 is open to the atmosphere, thereby releasing the high-pressure air from the firing chamber 112. For more details on the operation of such a known seismic gun 100, see U.S. Pat. No. 5,432,757 to Chelminski.

One factor that determines the amplitude of the primary pulse 106 (FIG. 1) is the amount of time that the port 114 is open to the atmosphere, i.e., the port time. The port time is determined, in part, by a force $F_r$ acting on the shuttle 102 that returns the shuttle 102 to the loaded position from the unloaded or fired position. This force $F_r$ is generated by the air pressure within the operating chamber 108 acting on the shuttle 102. In particular, the air pressure within the operating chamber 108 acts on shuttle flange 106 and the end 120 of the shuttle 102 (i.e., the thickness 120 of the shuttle 102). Ultimately, the air pressure acting on both sides of shuttle flange 106 cancels itself out and the resulting force causing movement of the shuttle is determined by the cross sectional thickness/area 120 of the shuttle flange 102.

One disadvantage that the known seismic air guns 100 is that the port time is too small because the return force $F_r$ acting on the shuttle 102 is too large. This reduces the amount of pressurized air that escapes from the firing chamber 112 through port 114, thereby reducing the amplitude of the primary pulse 186 (FIG. 1).

Accordingly, what is need is a cylindrical shuttle air gun having a high sound level output with a central bore of large enough diameter to be capable of carrying control lines and air hoses, passing through the bore. The air gun should allow more air to escape, thus creating a larger initial pulse by virtue of creating a larger Torus bubble and thereby minimizing the impact of secondary pulses on the effectiveness of the air gun. The seismic air gun should preferably allow the return force to be optimized to increase the port time and thereby increase the amplitude of the primary wave, while reducing the amplitude of the secondary waves, by allowing the shuttle to stay open longer after the peak of the primary pulse has occurred. This "after-flow" air tends to dampen the strength of the secondary pulses. The seismic air gun must also be strong enough to withstand the forces generated during repeated firing/loading.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

SUMMARY

An air gun, according to one embodiment of the present invention, includes a first position wherein the air gun is unloaded and a second position wherein the air gun is loaded. The air gun features a body defining a first cavity disposed along a longitudinal axis of the body, an operating chamber, a firing chamber, a first passageway between the operating chamber and the firing chamber, and a port. The port is adapted to be in fluid communication with the firing chamber and an outlet in fluid communication with the atmosphere.

A shuttle is disposed between the operating chamber and the firing chamber and is movable along the longitudinal axis of the body. The shuttle includes a shuttle nose region disposed proximate a first end region of the shuttle. The shuttle nose extends beyond the operating chamber towards the first end of the body. The shuttle also includes a firing shuttle flange disposed proximate a second end region of the shuttle substantially opposite the first end region. The firing shuttle flange selectively seals the firing chamber from the port. The air gun also includes a shuttle flange disposed within the operating chamber proximate the shuttle nose region.

The air gun preferably includes a first seal disposed between a first end of the operating chamber, the shuttle nose, and the operating chamber. The first seal includes a body, at least one arm disposed proximate the shuttle, and a biasing device biasing the arm towards the shuttle. A second seal is disposed between a second end of the operating chamber, the body, and the second end region of the shuttle. The air gun optionally includes a first and a second bearing disposed proximate an outer surface of the shuttle proximate a first and a second end of the operating chamber, respectively.

An adjustable return force urging the shuttle from the first position to the second position is independent of a total thickness of the shuttle and is directly proportionate to the difference between a first and a second cross-sectional thickness of a first and a second substantially opposing region of the shuttle flange, respectively. Alternatively, the return force is substantially directly proportionate to the difference between a first and a second area corresponding to the first and second regions, respectively.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

An air gun 10, FIG. 3, according to the present invention, is capable of producing powerful primary seismic wave and minimal secondary waves as will be explained in greater detail hereinbelow. These seismic waves penetrate deeply into subsurface material and are reflected and refracted therein by the various strata and formations. The reflected or refracted waves are sensed and recorded to provide information and data about the geological conditions and formations as is well known to those skilled in the art.

The air gun 10, according to the present invention, includes at least one generally centrally located passage/cavity 44 disposed longitudinally along the length L of the air gun 10. In the preferred embodiment, the cavity 44 forms a generally cylindrical passageway (though this is not a limitation of the present invention) sized and shaped to accept one or more electrical wires, air hoses, sensors, or the like 46 (hereinafter collectively referred to as "lines").

As will be explained in greater detail hereinbelow, pressurized air (in the form of one or more powerful, short, abrupt pulses) exits a plurality of ports 46 (only one shown) disposed about the exterior circumferential perimeter of the air gun body 11 and creates the seismic or pressure wave necessary for seismic exploration. In contrast to conventional air guns (e.g., Bolt Technologies Model 1500 or 1900 air guns) where control line and hoses are in relative proximity to the ports, because the lines 46 of the present invention are disposed within the cavity 44 in the center of the body 11 of the air gun 10, the lines 46 are not within the pathway of the seismic pulses, and consequently are subjected to significantly less force upon firing. Moreover, because the lines 46 are contained within the body 11 of the air gun 10, the air gun 10 does not require a bundle of hoses and electrical cables disposed outside of the air guns water generally above the air guns, and therefore does not suffer from any of the disadvantages of the known designs such as the need for separate handling equipment, likelihood of damage. Also, each gun can be provided with a plurality of connections (not shown) on each end for connecting the necessary lines 46. In this manner, one or more arrays of air guns 10 can be easily formed by simply connecting the supplied input and output connections of each air gun 10 to the input/output connections of other air guns 10 or to a supply line (not shown) extending from the tow vessel (not shown).

In order to form the cavity 44 within the body 11 of the air gun 10, the air gun 10 according to one embodiment of the present invention includes at least one generally cylindrical shuttle 20. In the exemplary embodiment, the shuttle 20 is disposed substantially continuously around the outside of the cavity 44 of body 11 of the air gun 10.

Figure 3:
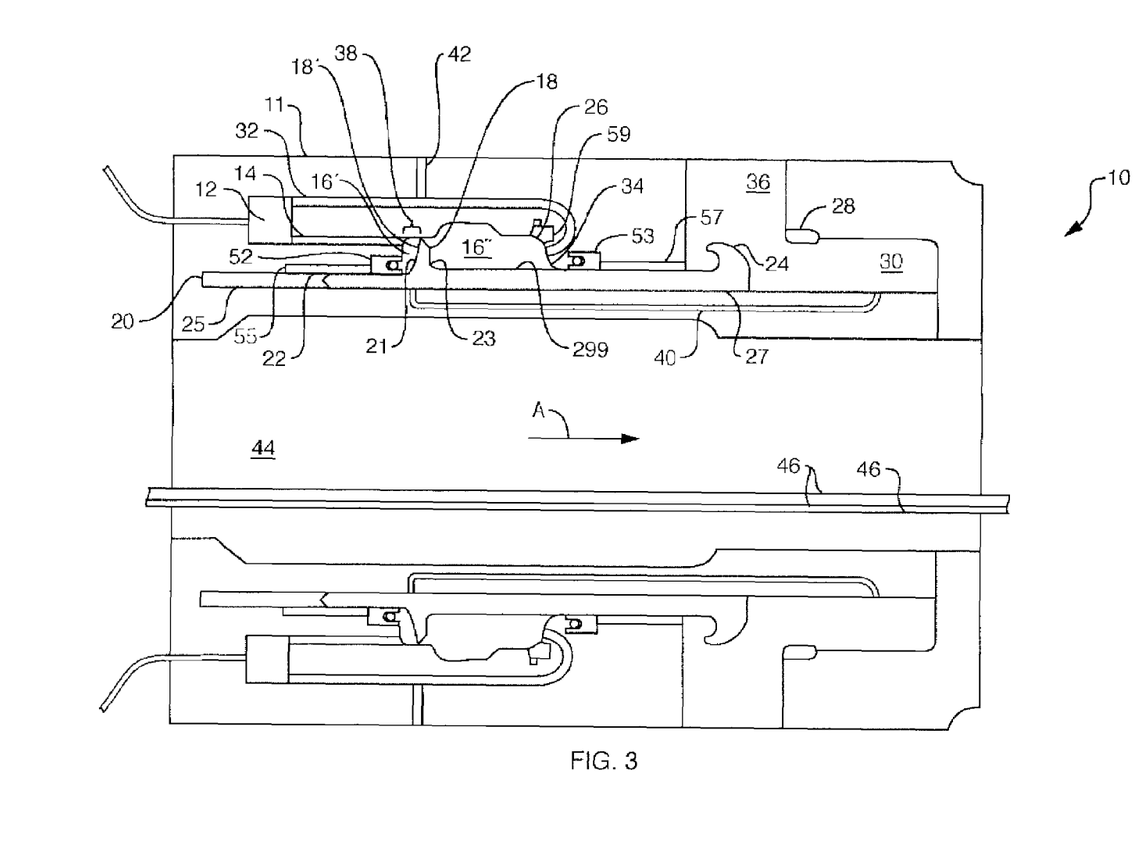
FIG. 3 is a sectional view of one embodiment of the seismic air gun shown in the unloaded or fired position according to the present invention.

As will be explained in greater detail hereinbelow, the shuttle 20 moves from an unload position shown in FIG. 3, to a loaded position shown in FIG. 4, and finally back again to the unloaded position as shown in FIG. 3, thereby producing powerful sound pulse from ports 36 as the air gun 10 is fired. The return force ($F_r$) acting on the generally cylindrical shuttle 20 (i.e., the force returning the shuttle 20 from the unloaded position shown FIG. 3 to the loaded position shown in FIG. 4) can be infinitely adjusted to such that the port time, i.e., the amount of time the firing chamber 30 and the port 36 are both open to the atmosphere, can be infinitely adjusted. By adjusting the port time, the amplitude of the primary pulse generated by the seismic gun 10 can be adjusted and the amplitude of the second pulses can also be adjusted.

Figure 5:
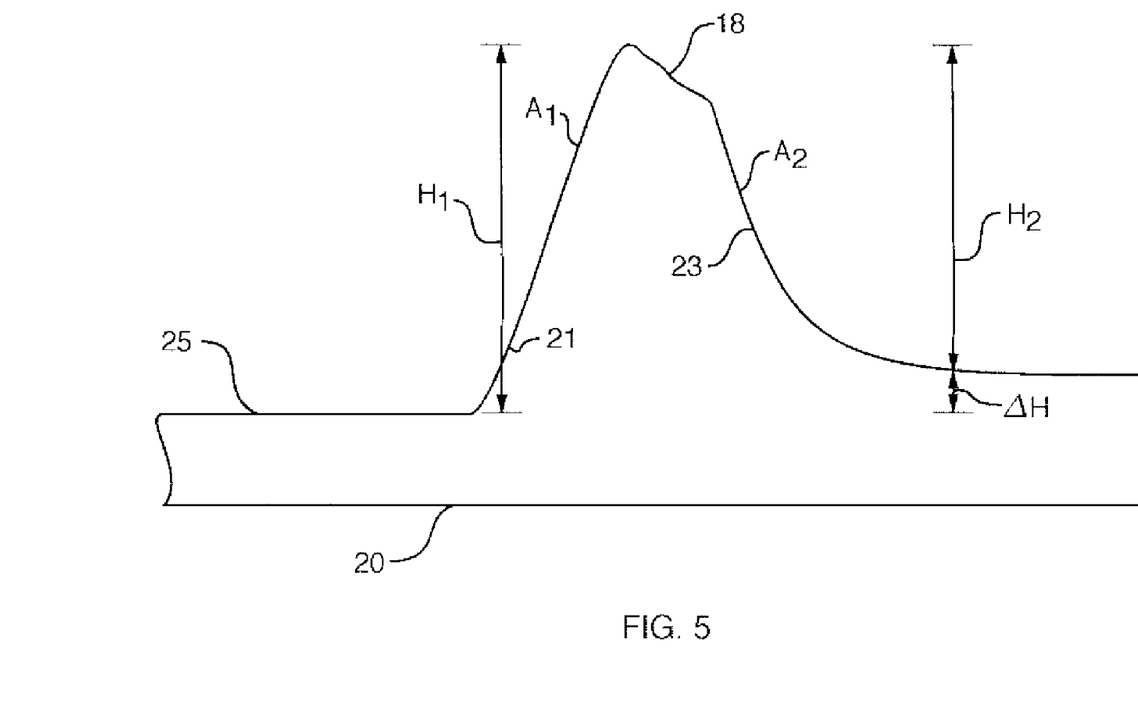
FIG. 5 is a sectional view of one embodiment of the shuttle flange shown in FIG. 3 according to the present invention.

A pressurized air input hose/fitting (not shown) at the top outside portion of body 11, near valve 12, allows pressurized air (other fluids/gases may also be used) to flow from the main air supply line 46 through air supply passageway 14 and into operating chamber 16. The generally cylindrical shuttle 20 includes a shuttle flange 18 disposed within the operating chamber 16 as well as a shuttle nose region 25. As best shown in FIG. 5, shuttle flange 18 includes a first region 21 having a surface area A1 that is larger than the surface area A2 of a second region 23. In an exemplary embodiment, area A1 has a height H1 that is greater than the height H2 of the second area H2 (i.e., ?H). As will be explained in greater detail hereinbelow, by adjusting ?H (i.e., the relative areas of the first and second surface areas A1, A2), the return force $F_r$ can be adjusted.

Figure 4:
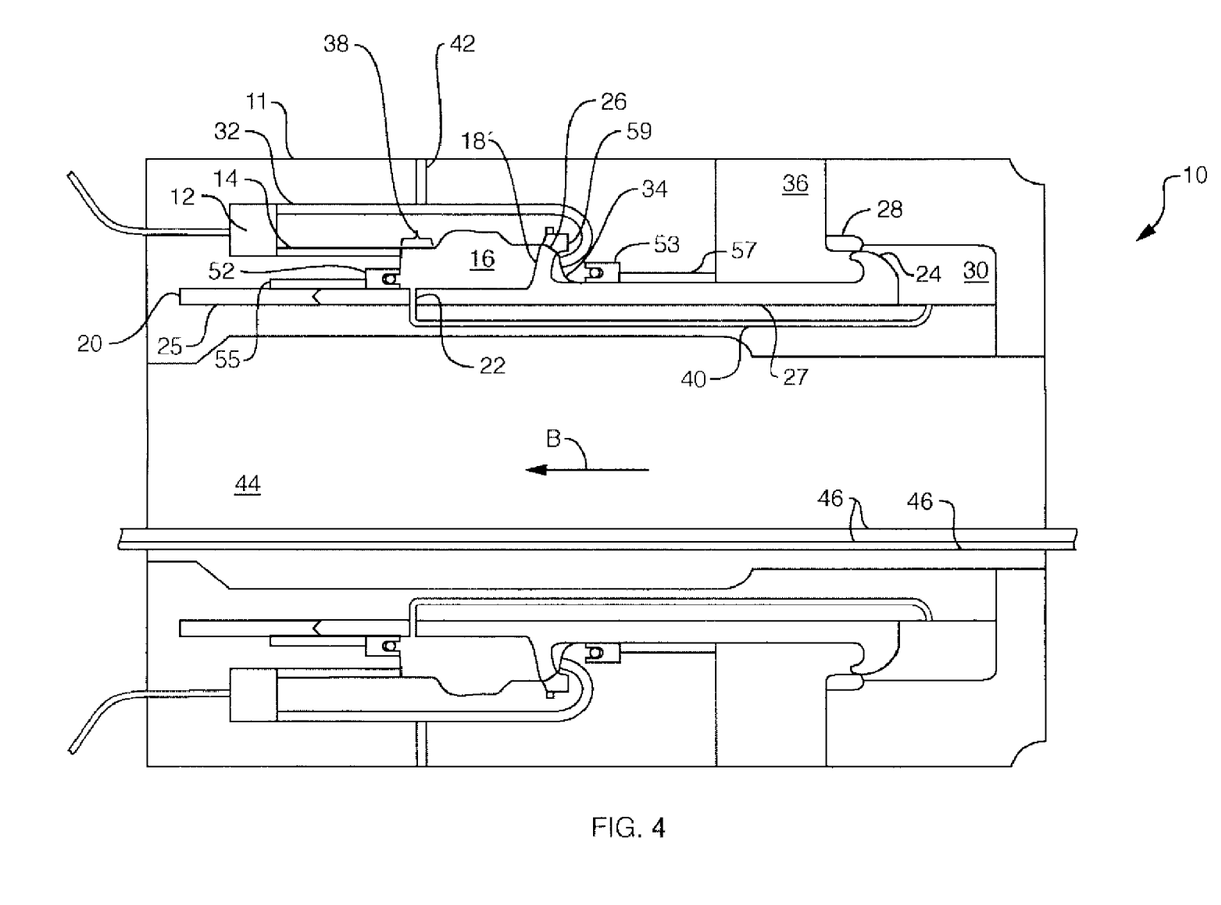
FIG. 4 is a sectional view of one embodiment of the seismic air gun shown in FIG. 3 in the loaded position according to the present invention.

Referring back to FIG. 3, as pressurized air enters into the operating chamber 16 from the air supply passageway 14, seals 52, 53 prevent the pressurized air from leaking out of the operating chamber 16. The force exerted by the pressurized air in the first region 16' of the operating chamber 16 against the first region 21 of the shuttle flange 18 is larger than the force exerted by the pressurized air in the second region 16" of the operating chamber 16 against the second region 23 of the shuttle flange 16. The resulting force $F_s$ (equal to the air pressure and the difference in areas between A1 and A2) urges the shuttle 20 in the direction of arrow A until the shuttle 20 is in the "loaded" or "ready to fire" position shown in FIG. 4. As will be explained in greater detail hereinbelow, it is important to note that the shuttle nose region 25 extends beyond the operating chamber 16 while the seismic gun 10 is in the unloaded position (FIG. 3) and the loaded position (FIG. 4).

Operating bearings 55 and 57 are preferably disposed on the outer surface of the shuttle 20 and aid in guiding the shuttle 20 as it moves. It is important to note that positioning the bearings 55, 57 proximate the outer surface of the shuttle 20 allows the shuttle 20 to be more concentric with the seal 52, 53 because of the tolerance stack-up, than it would be if the bearings would be if they were located on the inside of the shuttle.

Shuttle 20 also includes an orifice 22 disposed proximate the shuttle nose region 25 and a firing shuttle flange 24 proximate a second region 27. In the unloaded position shown in FIG. 3, seal 52 creates an air-tight seal between the shuttle nose region 25 and the body 11 and prevents air from flowing around the shuttle nose region 25 and the body 11 and from reaching the orifice 22. Accordingly, the pressure generated by the pressurized air acts only on the outer surface 299 of the shuttle 20. Additionally, the firing shuttle flange 24 is disposed such that firing chamber 30 and port 36 are open to the atmosphere.

Figure 6:
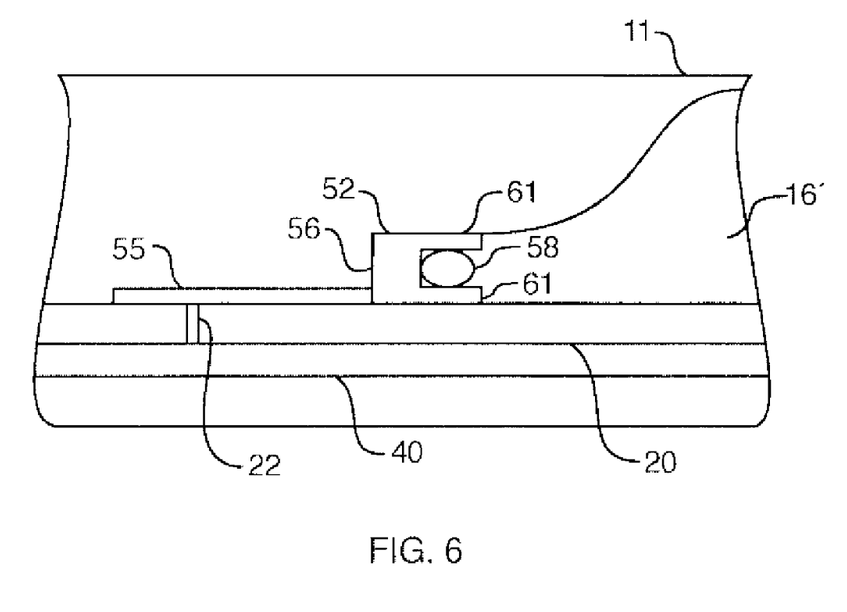
FIG. 6 is a cross sectional view of one embodiment of a first and a second seal shown in FIGS. 3 and 4 according to one embodiment of the present invention.

Referring specifically to FIG. 6, the seal 52 is shown in greater detail. It is important to note that the seal 52 is not open to the atmosphere (unlike seal 53). Accordingly, the seal 52 is not lubricated by water and therefore must be capable of repetitive operation without the lubricating benefits of water.

In the preferred embodiment, the seal 52 includes a body 56 made from an elastomeric material. The body 56 includes one or more arms/lips 61, with at least one arm 61 proximate or contacting the shuttle 20. The arms 61 are biased by a biasing device 58 towards the shuttle 20. The biasing device 58 allows the seal 52 to create an effective seal even as the arm 61 is worn by ensuring that the arm 61 continually contacts the shuttle 20 even as the arm 61 is worn. As a result, the seal 52 has a long service life and is capable of operating without a lubricant such as water. Unlike a traditional o-ring type seal, the interface between the seal 52 and the shuttle 20 is flat. Consequently, the seal 52 does not roll on itself as the shuttle 20 moves.

In the exemplary embodiment, the biasing device 58 includes a rubber ring that forces the arm 61 towards the shuttle 20. Alternatively, a spring or any other device known to those skilled in the art may be used to bias the arm 61 towards the shuttle 20

In the preferred embodiment, seal 53 is substantially the same as seal 52. However, because seal 53 is open to the atmosphere, seal 53 will be at least partially lubricated by the water. Accordingly, seal 53 does not have to withstand the same forces during operation.

In the loaded position shown in FIG. 4, shuttle flange 18 contacts operating chamber shoulder 26 of the operating chamber 16, firing shuttle flange 24 contacts firing chamber shoulder and/or seal 28, and firing chamber 30 is sealed off from port 36. In the preferred embodiment, seal 59 prevents pressurized air from leaking around the shuttle flange 18 as will be described in greater detail hereinbelow. Orifice 22 is now in fluid communication with operating chamber 16, thus allowing hi-pressure air (approximately 2000 psi) to flow from the operating chamber 16, through passageway 40, to firing chamber 30 until the pressure $P_{oc}$ within the operating chamber 16 is equal to the pressure $P_{fc}$ within the firing chamber 30. The force $F_{sh}$ exerted by the pressurized air on the shuttle flange 18 is slightly higher than force $F_{fc}$ exerted by the pressurized air on the firing shuttle flange 24 due to the difference in surface area between the shuttle flange 18 and the firing shuttle flange 24, therefore the shuttle 20 is held in the position shown in FIG. 2.

Figure 7:
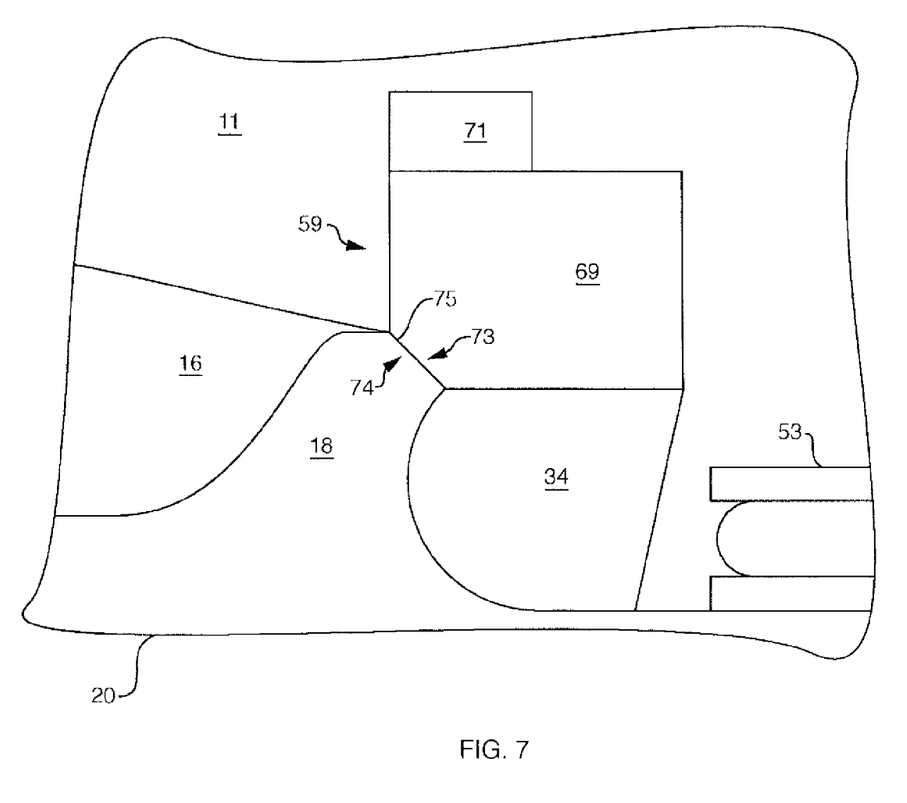
FIG. 7 is a cross sectional view of one embodiment of a third seal shown in FIGS. 3 and 4 according to one embodiment of the present invention.

Referring specifically to FIG. 7, when the shuttle 20 is in the loaded position (i.e., the position shown in FIG. 4), the shuttle flange 18 preferably seals the chamber 34 which is a subsection of the operating chamber 16 disposed between the second region 23 (FIG. 3) of the shuttle flange 18 and the distal end of operating chamber 16. In the exemplary embodiment, seal 59 prevents pressurized air within operating chamber 16 from leaking around the shuttle flange 18 and the body 11 into chamber 34. Chamber 34 is vented to atmosphere, through firing air passage 32 and vent orifice 42. The seal 59 preferably includes a body 69 made from an engineering plastic material such as polyetheretherketone (peek) and a elastomeric seal device 71. As the shuttle flange 18 contacts the seal 59, the seal system 59 prevents air from leaking into chamber 34.

The body 69 preferably includes a conical flange region 73 shaped and sized to correspond with the conical flanged region 74 of the shuttle flange 18 such that the interface 75 between the flanged regions 73, 74 is substantially air-tight. The elastomeric seal device 71, preferably a rubber material or the like, prevents pressurized air from leaking from operating chamber 16 around the outside of seal 59 into chamber 34.

To fire the air gun 10, FIG. 4, an electronic trigger causes valve 12 to open firing air passageway 32. Pressurized air then enters into chamber 34. The pressurized air within the chamber 34 exerts a force $F_b$ against the second region 23 (FIG. 3) of the shuttle flange 18 in the direction of arrow B. Force $F_b$ is greater than the difference between $F_{oc}$ and $F_{fc}$, and consequently force $F_b$ urges the shuttle 20 in the direction of arrow B. Put another way, the sum of $F_b$ and $F_{fc}$ is greater than $F_{oc}$. The shuttle 20 gains speed (approximately 100 ft/s) almost instantly until the firing shuttle flange 24 moves past firing chamber seal 28, thereby opening firing chamber 30 to port 36, and closes orifice 22.

As firing chamber 30 opens, the high pressure air stored within the firing chamber 30 is suddenly released from the firing chamber 30 and moves through port 36 where it produces the desired seismic impulse.

Shuttle 20 continues to move in the direction of arrow B until the shuttle flange 18 moves within region 38 of the operating chamber 16, FIG. 3. Region 38 of the operating chamber is sized and shaped such that shuttle flange 18 is in close proximity with the operating chamber 16. Consequently, the air between the first region 21 of the shuttle 20 and the inlet of the operating chamber 16 forms a "cushion" or "dampener", thus preventing the shuttle 20 from slamming against the body 11 of the air gun 10.

When the shuttle 20 is disposed in the position shown in FIG. 3, the shuttle 20 quickly reverses direction wherein shuttle operating flange 18 approaches operating seal 59 as vent orifice 42 is venting firing air passage and the chamber 34 is being formed. When operating flange 18 seals against operating seal 59 and firing flange 24 is plugged into firing seal 28, the air gun 10 is being loaded by the compressed air flowing in through air input passage 14 through fill orifice 22 and passage 40 into firing chamber 30. The firing chamber 16 is generally filled to full pressure in approximately 1 to 8 seconds, readying the air gun 10 for the next firing.

As discussed above, the pressurized air within the operating chamber 16 creates a return forces $F_r$ that acts on the shuttle 20 urging the shuttle 20 to the loaded position (FIG. 4). Force $F_r$ is proportionate to the difference between the A1 and A2, FIG. 5. This difference is equal to ?H (the difference in height between A1 and A2).

In the prior art, the air pressure acts on the actual radial circumferential area 121 of the flange 102, FIG. 2, including the end 120 of the flange 102. The minimum return force of the prior art designs is thus dictated by the minimum thickness 121 of the flange 102 necessary for the flange 102 to have sufficient structural rigidity to withstand the forces generated during use.

As explained above, the air pressure of the present invention 10, FIG. 3, only acts on the outer surface 299 of the shuttle 20 because the shuttle nose 25 and the distal or second end 27 of the shuttle 20 extend beyond the operating chamber 16. Consequently, the magnitude of the return force is independent of the total thickness of the shuttle 20, and instead is simply proportionate to ?H. This allows the shuttle 20 to be constructed sufficiently thick to repetitively withstand the forces generated during use, while still allowing the air gun to be adjusted to an optimum shuttle return force. For exemplary purposes only, it has been found that a difference in height ?H between $H_1$ of A1 and $H_2$ of A2 of approximately 1/16" results in a return force $F_r$ that is sufficiently small to allow the maximum amount of pressurized air to exit the firing chamber 30 through port 36 while providing a large enough return force $F_r$ to reload the air gun 10 and not allow a substantial amount of water to enter the firing chamber 30.

As a result, the magnitude of the return force $F_r$ can be set by simply adjusting the relative areas A1, A2 (H1, H2, and ?H) without weakening the shuttle 20. Consequently, the port time can be increased, thereby allowing more of the high-pressure air within the firing chamber to be released in the primary pulse (thus increasing the amplitude of the primary pulse). Since the shuttle 20 stays open longer, more air at the tail end of the primary pulse can escape, thereby dampening the secondary pulses.

As mentioned above, the present invention is not intended to be limited to a system or method which must satisfy one or more of any stated or implied object or feature of the invention and should not be limited to the preferred, exemplary, or primary embodiment(s) described herein. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the claims when interpreted in accordance with the breadth to which they are fairly, legally and equitably entitled.

The invention claimed is:

1. An air gun comprising:
   a body having a first and a second end;
   a port disposed proximate said second end of said body, said port having an outlet open to the atmosphere and an inlet;
   an operating chamber disposed proximate said first end of said body, said operating chamber in fluid communication with an air supply;
   a firing chamber disposed proximate said second end of said body, said firing chamber adapted to be in fluid communication with said inlet of said port and said operating chamber; and
   a shuttle disposed between said operating chamber and said firing chamber, said shuttle including:
      a shuttle flange disposed within said operating chamber, said shuttle having a first and a second region disposed on opposite sides of said shuttle flange, said first and said second region having a first and a second radial cross-sectional area, respectively;
      a firing shuttle flange adapted to selectively open said firing chamber to said port and seal said firing chamber form said port; and
      a shuttle nose region proximate said shuttle flange and extending beyond said operating chamber towards said first end of said body wherein a return force urges said shuttle from an unloaded position to a loaded position, and wherein a magnitude of said return force proportionate to the difference between said first and said second cross-sectional thickness of said shuttle.

2. The air gun as claimed in claim 1 wherein said body includes a first and a second seal disposed proximate a first end and a second end of said operating chamber, respectively.

3. The air gun as claimed in claim 2 wherein at least said first seal include a body having at least one arm disposed proximate said shuttle and a biasing device biasing said at least one arm towards said shuttle.

4. The air gun as claimed in claim 2 wherein said body further includes a first passageway between said operating chamber and said firing chamber, and wherein said shuttle nose includes an orifice disposed such that when said air gun is in said unloaded position, said first seal seals said orifice from said operating chamber and said first passageway is blocked, and when said air gun is in said loaded position, said orifice is open to said first passageway such that said operating chamber and said firing chamber are in fluid communication with each other.

5. The air gun as claimed in claim 1 wherein said first and said second region of said shuttle flange includes a first and a second area, respectively, wherein said return force is substantially directly proportionate to the difference between said first and said second area.

6. The air gun as claimed in claim 1 wherein said first end region of said operating chamber is sized and shaped such that said shuttle flange of said shuttle is in close proximity with an interior surface of said operating chamber when said shuttle is disposed in said first position.

7. The air gun as claimed in claim 1 wherein said shuttle flange and said firing shuttle flange are sized and shaped such that pressurized air within said operating chamber exerts a force $F_{oc}$ against said shuttle flange in a first direction that is larger than a force $F_{fc}$ exerted against said firing shuttle flange in a second direction opposite said first direction by pressurized air within said firing chamber when said air gun is disposed in said loaded position.

8. The air gun as claimed in claim 7 wherein an end region of said operating chamber proximate said second end of said body is sized and shaped to form a second chamber when said shuttle is disposed in said loaded position.

9. The air gun as claimed in claim 8 wherein said body includes a third seal, wherein said third seal creates a seal between said second chamber and said shuttle flange when said air gun is in said loaded position.

10. The air gun as claimed in claim 9 wherein said third seal includes a body made from an expandable material and a biasing device disposed between said air gun body and said body of said third seal, said biasing device biasing said seal body towards said shuttle flange.

11. The air gun as claimed in claim 1 wherein said body includes a first and a second bearing disposed proximate an outer surface of said shuttle proximate a first and a second end of said operating chamber, respectively.

12. An air gun having a first position wherein said air gun is unloaded and a second position wherein said air gun is loaded, said air gun comprising:
    a body defining a first cavity disposed along a longitudinal axis of said body, said body having:
        an operating chamber disposed proximate a first end of said body;
        a firing chamber disposed proximate a second end of said body; and
        a port having an inlet adapted to be in fluid communication with said firing chamber and an outlet in fluid communication with the atmosphere;
    a shuttle disposed between said operating chamber and said firing chamber and movable along said longitudinal axis of said body, said shuttle having:
        a shuttle nose disposed proximate a first end region of said shuttle, said shuttle nose extending beyond said operating chamber towards said first end of said body;
        a firing shuttle flange disposed proximate a second end region of said shuttle substantially opposite said first end region wherein said firing shuttle flange selectively seals said firing chamber from said port; and
        a shuttle flange disposed within said operating chamber proximate said shuttle nose region, wherein a return force urging said shuttle from said first position to said second position is adjustable and is independent of a total radial thickness of said shuttle; and
    a first and at least a second seal disposed proximate a first and a second end region of said operating chamber, respectively, said first and said second seals creating a seal between said operating chamber, said shuttle, and said body of said air gun.

13. The air gun as claimed in claim 12 wherein at least said first seal include a body having at least one arm disposed proximate said shuttle and a biasing device biasing said at least one arm towards said shuttle.

14. The air gun as claimed in claim 12 wherein said body further includes a first passageway between said operating chamber and said firing chamber, and wherein said shuttle nose includes an orifice disposed such that when said air gun is in said unloaded position, said first seal seals said orifice from said operating chamber and said first passageway is blocked, and when said air gun is in said loaded position, said orifice is open to said first passageway such that said operating chamber and said firing chamber are in fluid communication with each other.

15. The air gun as claimed in claim 12 wherein said return force is substantially directly proportionate to the difference between a first and a second radial cross-sectional thickness of a first and a second substantially opposing region of said shuttle flange, respectively.

16. The air gun as claimed in claim 12 wherein said body includes a first and a second bearing disposed proximate an outer surface of said shuttle proximate a first and a second end of said operating chamber, respectively.

17. The air gun as claimed in claim 12 wherein said second end region of said operating chamber proximate is sized and shaped to form a second chamber with said shuttle flange when said air gun is disposed in said second position, and wherein said body includes a third seal between said body, said second chamber, and said shuttle flange when said air gun is in said second position.

18. An air gun having a first position wherein said air gun is unloaded and a second position wherein said air gun is loaded, said air gun comprising:
    a body defining a first cavity disposed along a longitudinal axis of said body and having a first and a second end, said body including:
        an operating chamber;
        a firing chamber;
        a first passageway between said operating chamber and said firing chamber; and
        a port having an inlet adapted to be in fluid communication with said firing chamber and an outlet in fluid communication with the atmosphere; and
    a shuttle disposed between said operating chamber and said firing chamber, said shuttle movable along said longitudinal axis of said body, said shuttle having:
        a shuttle nose disposed proximate a first end region of said shuttle, said shuttle nose extending beyond said operating chamber towards said first end of said body;
        a firing shuttle flange disposed proximate a second end region of said shuttle substantially opposite said first end region wherein said firing shuttle flange selectively seals said firing chamber from said port;
        a first seal disposed between a first end of said operating chamber, said shuttle nose, and said operating chamber, said first seal having a body, at least one arm disposed proximate said shuttle, and a biasing device biasing said at least one arm towards said shuttle;

a second seal disposed between a second end of said operating chamber, said body, and said second end region of said shuttle;

an orifice disposed proximate said shuttle nose, said orifice selectively in fluid communication with said operating chamber while said air gun is in said second position; and a shuttle flange disposed within said operating chamber proximate said shuttle nose region, wherein a return force urging said shuttle from said first position to said second position is independent of a total radial thickness of said shuttle and is directly proportionate to the difference between a first and a second radial cross-sectional thickness of a first and a second substantially opposing region of said shuttle flange, respectively.

19. The air gun as claimed in claim 18 wherein said body further includes a first and a second bearing disposed proximate an outer surface of said shuttle proximate a first and a second end of said operating chamber, respectively.

20. The air gun as claimed in claim 19 wherein said second end region of said operating chamber proximate is sized and shaped to form a second chamber with said shuttle flange when said air gun is disposed in said loaded position, and wherein said body includes a third seal between said body, said second chamber, and said shuttle flange when said air gun is in said loaded position.

* * * * *